United States Patent
Okagaki et al.

(10) Patent No.: US 6,397,085 B1
(45) Date of Patent: May 28, 2002

(54) TELEPHONE WITH KEY-CLICK SOUND VOLUME CONTROL

(75) Inventors: Mitsunori Okagaki, Tottori; Yukio Nishimoto, Tottori-ken, both of (JP)

(73) Assignees: Sanyo Electronic Co., Ltd., Osaka; Tottori Sanyo Electric Co., Ltd., Tottori, both of (JP)

( * ) Notice: Subject to any disclaimer, the term of this patent is extended or adjusted under 35 U.S.C. 154(b) by 0 days.

(21) Appl. No.: 09/670,287

(22) Filed: Sep. 25, 2000

Related U.S. Application Data

(63) Continuation of application No. PCT/JP00/00599, filed on Feb. 3, 2000.

(30) Foreign Application Priority Data

Feb. 22, 1999 (JP) .......................................... 11-043399
Feb. 26, 1999 (JP) .......................................... 11-050765

(51) Int. Cl.[7] ............................. H04B 1/38; H04M 1/00
(52) U.S. Cl. ............................. 455/567; 379/433.06
(58) Field of Search ........................ 455/99, 569, 575, 455/95, 343, 344, 572, 355, 557, 567, 150.1; 379/200, 433.06, 433.07, 368

(56) References Cited

U.S. PATENT DOCUMENTS

| | | | | |
|---|---|---|---|---|
| 4,254,303 A | * | 3/1981 | Takizawa | 381/107 |
| 4,297,534 A | * | 10/1981 | Epstein et al. | 379/200 |
| 4,438,527 A | * | 3/1984 | Hammond | 381/107 |
| 5,170,491 A | | 12/1992 | Murata | |
| 5,170,499 A | * | 12/1992 | Grothause | 455/238.1 |
| 5,212,811 A | * | 5/1993 | Kuge et al. | 455/73 |
| 5,349,698 A | * | 9/1994 | Maru | 455/557 |
| 5,381,460 A | * | 1/1995 | Ohashi et al. | 455/550 |
| 5,388,152 A | * | 2/1995 | Kawauchi | 379/157 |
| 5,444,306 A | | 8/1995 | Sawa et al. | |
| 5,448,620 A | * | 9/1995 | Gershkovich et al. | 455/552 |
| 5,450,618 A | * | 9/1995 | Naddell et al. | 455/575 |
| 5,479,476 A | * | 12/1995 | Finke-Anlauff | 455/550 |
| 5,615,256 A | * | 3/1997 | Yamashita | 379/390 |
| 5,799,244 A | * | 8/1998 | Matsumoto | 455/67.3 |
| 5,805,084 A | * | 9/1998 | Mannisto | 341/22 |
| 5,883,963 A | * | 3/1999 | Tonella | 381/104 |
| 6,002,763 A | * | 12/1999 | Lester et al. | 379/421 |
| 6,006,114 A | * | 12/1999 | Seppanen et al. | 455/567 |
| 6,047,195 A | * | 4/2000 | Nakanishi | 455/552 |
| 6,285,891 B1 | * | 9/2001 | Hoshino | 455/567 |

FOREIGN PATENT DOCUMENTS

| | | |
|---|---|---|
| JP | 0444929 A2 | 9/1991 |
| JP | 04287740 A | 10/1992 |
| JP | 05095394 A | 4/1993 |
| JP | 06252821 A | 9/1994 |
| JP | 07175566 * | 7/1995 |
| JP | 10271566 A | 10/1998 |

OTHER PUBLICATIONS

Nokia, Quick Guide to Functions Nokia 252, Sep. 4, 1997, pp. 36–39.*
Press Release, The New Nokia 252 analog Cellular Phone Takes color Design to New Heights, Sep. 4, 1997, p. 1.*
Annual & Interim Reports 1997, Nokia in Jan.–Sep. 1997, entire document.*

* cited by examiner

Primary Examiner—Vivian Chin
Assistant Examiner—Charles N. Appiah
(74) Attorney, Agent, or Firm—William E. Pelton, Esq.

(57) ABSTRACT

A car phone can be run from the battery of a vehicle in which it is mounted or from its own battery. If the vehicle ignition switch is turned off during communication, interrupting the supply of electric power from the vehicle battery, communication can continue because the internal power supply is automatically switched in. The phone has a speaker capable of emitting a key-click sound. A setting device sets the volume of the key-click sound. A controller is operative when communication is not in progress for adjusting the key-click sound to the volume set by the setting device. The controller is operative when communication is in progress for adjusting the key-click sound to a volume set by the setting device if the volume set by the setting device is equal to or less than a predetermined volume and for adjusting the key-click sound to the predetermined volume if the volume set by the setting device is greater than the predetermined volume.

1 Claim, 8 Drawing Sheets

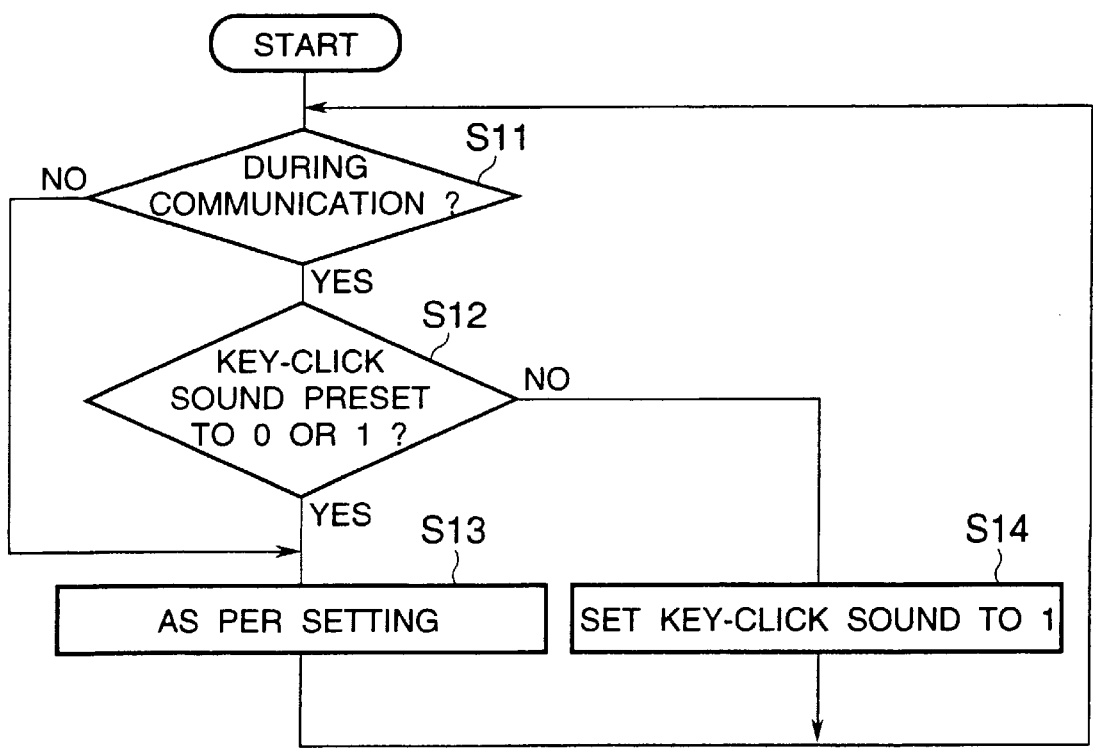

TELEPHONE WITH KEY-CLICK SOUND VOLUME CONTROL

This application is a continuation of PCT International application No. PCT/JP00/00599, filed Feb. 3, 2000, designating the United States of America, the contents of which are incorporated by reference into the present application.

TECHNICAL FIELD

The present invention relates to a vehicle-installed telephone apparatus which can be additionally supplied with electric power from an external power supply in the vehicle. The present invention also relates to a telephone apparatus which emits a key-click sound from its receiver.

BACKGROUND ART

A vehicle-installed telephone apparatus that is directly connected to the vehicle's battery, which is used as an external power supply, has been contrived to enable communication even when the vehicle is parked and its ignition switch is turned off, by manual switchover to the external power supply. Furthermore, a vehicle-installed telephone apparatus has been contrived that has a switch for switching between an internal power supply and an external power supply, and switches to the internal power supply when the ignition switch is tuned off (Japanese Patent No. 2,845,810). This patent also discloses a vehicle-installed telephone apparatus that has a first switch for turning an internal power supply on and off and a second switch for turning an external power supply on and off, and automatically turns on the power of the apparatus when a key is operated, even if the ignition switch is off, by controlling these switches and using the internal power supply.

However, the conventional vehicle-installed telephone apparatuses required a switch for turning the external power supply on and off, in addition to a switch for turning the internal power supply on and off. Furthermore, when the ignition switch was off, the conventional vehicle-installed telephone apparatuses could not be powered on unless some operation was performed; a passenger not knowing this would first operate the power key. A further problem was that it was not possible, while parked, to see the time, or information about being within communication range, etc., on the display by just picking up the vehicle-installed telephone apparatus.

A telephone apparatus that emits a key-click sound from its receiver for confirmation of the press of a key has also been contrived (Japanese Unexamined Patent Publication No. 62-272738). However, the volume of the key-click sound is adjusted so that just the right sound level is obtained when the key is operated while being viewed at some distance from the eye (about 40 cm, for example). Therefore, when a key is operated during communication, it sounds very loud since it is close to the ear.

DISCLOSURE OF INVENTION

The present invention has been made in light of the above problems, with the object of providing a vehicle-installed telephone apparatus that enables communication to continue, by use of an internal power supply, even if the ignition switch is turned off during communication, interrupting the supply of external power.

Another object of the present invention is to provide a vehicle-installed telephone apparatus that can reduce the drain on its internal power supply by using an external power supply, if power is supplied from the external power supply even when the ignition switch is turned off during communication.

Another object of the present invention is to provide a vehicle-installed telephone apparatus that, with a single switch, can perform both manual power-on/off and control of the supply of power from an internal power supply if the supply from an external power supply is halted when the ignition switch is turned off.

Another object of the present invention is to provide a vehicle-installed telephone apparatus that, when the ignition switch is turned off and the supply from the external power supply is halted, can maintain power by using an internal power supply when the telephone apparatus is simply picked up from its holder, and can therefore display information on its display unit without requiring any key operation.

Another object of the present invention is to provide a telephone apparatus that can avoid having the user hear loud click sounds during communication.

A vehicle-installed telephone apparatus according to a first aspect of the present invention comprises:
  an internal power supply (20) for supplying electric power within the apparatus;
  a connecting unit (21b) for connecting an external power supply (50) from the vehicle in parallel with said internal power supply (20);
  a switch (22) for turning on and shutting off the supply of electric power into the apparatus from said internal power supply and said external power supply, which are connected in parallel;
  ignition-on/off detection means (17) for detecting whether the ignition switch of the vehicle is on or off; and
  control means (12) for controlling said switch so as to supply electric power to the apparatus if communication is in progress, even when said ignition-on/off detection means (17) detects that the ignition switch is off.

A vehicle-installed telephone apparatus according to a second aspect of the present invention comprises:
  an internal power supply (20) for supplying electric power within the apparatus;
  a connecting unit (21b) for connecting an external power supply (50) from the vehicle in parallel with said internal power supply (20);
  a switch (22) for turning on and shutting off the supply of electric power into the apparatus from said internal power supply and said external power supply, which are connected in parallel;
  ignition-on/off detection means (17) for detecting whether the ignition switch of the vehicle is on or off;
  placement detection means (18) for detecting whether the apparatus is placed in a predetermined position in the vehicle; and
  control means (17) for controlling said switch so as to supply power to the apparatus if said placement detection means (18) detects that the apparatus is not placed in the predetermined position, even when said ignition-on/off detection means (17) detects that the ignition switch is off.

A telephone apparatus according to a third aspect of the present invention comprises:
  a speaker (4) which is disposed in the receiver (40) and emits a key-click sound; setting means (12) for setting the volume of the key-click sound emitted from said speaker; and control means (12) for adjusting the key-click sound to at most a predetermined volume during communication, and adjusting the key-click sound to the volume set by said setting means if communication is not in progress.

BRIEF DESCRIPTION OF DRAWINGS

FIG. 9 shows the types of key-click sounds.

FIG. 10 is a flow chart showing the principal operation of the second embodiment.

BEST MODE FOR CARRYING OUT THE INVENTION

Figure 1:
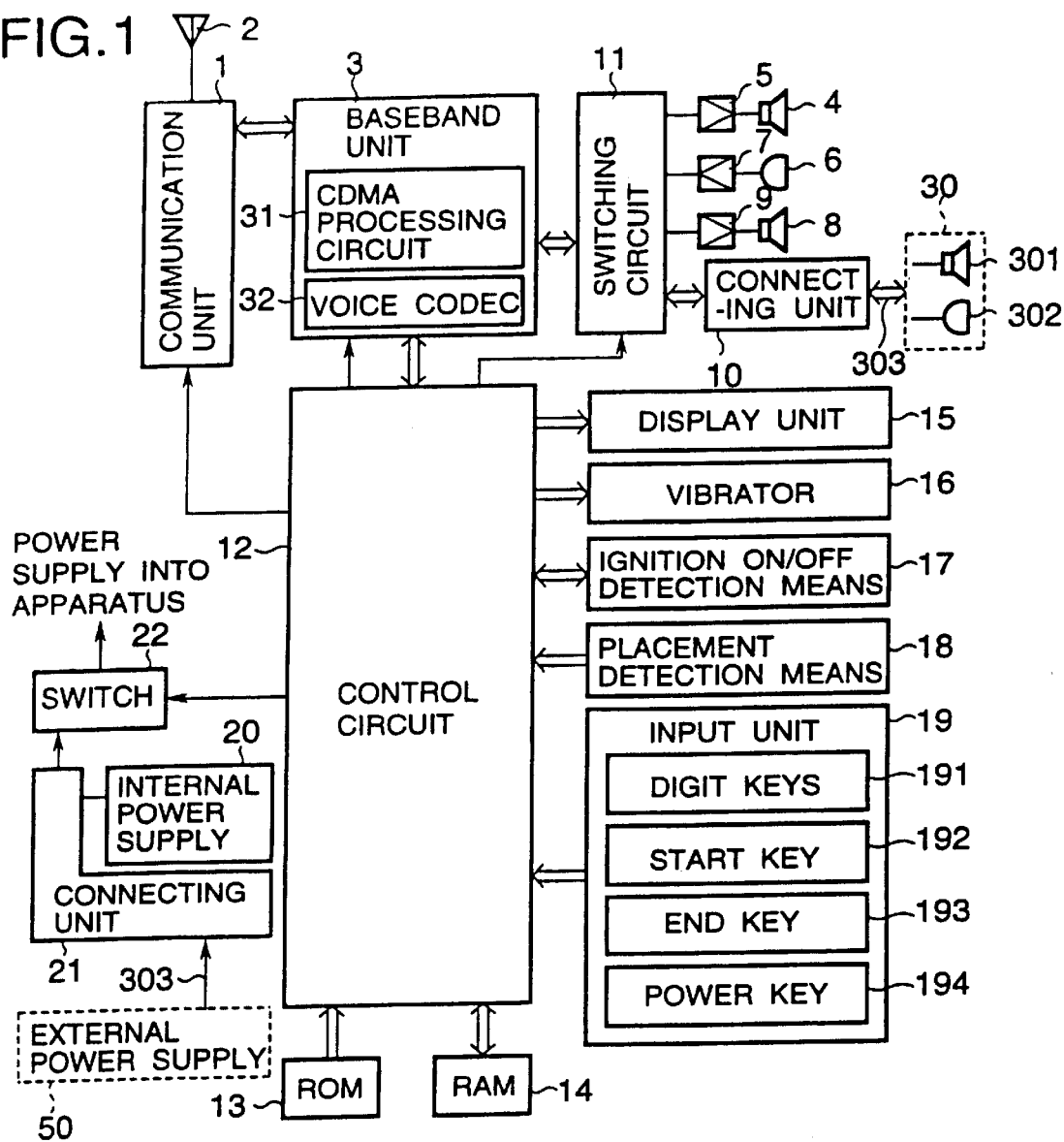
FIG. 1 is a block diagram showing principal elements of the first embodiment of the invention.

Embodiments of the invention will now be explained with reference to the drawings. FIG. 1 is a block diagram showing principal elements of the first embodiment. The vehicle-installed telephone apparatus of this embodiment is a cellular phone of the CDMA type, which uses a plurality of carriers of the same frequency in the same cell.

A communication unit 1 transmits signals from a baseband unit 3 to a base station through an antenna 2, and receives radio waves from the base station through the antenna 2.

The baseband unit 3 has a CDMA processing circuit 31 and a voice codec 32. The CDMA processing circuit 31 performs code division multiple access, scramble, error control, and timing detection. The voice codec 32 compresses (codes) and expands (decodes) speech, performs conversion between analog and digital, and changes the receiving volume and the sensitivity of a microphone by means of an internal amplification circuit (not shown).

Figure 3:
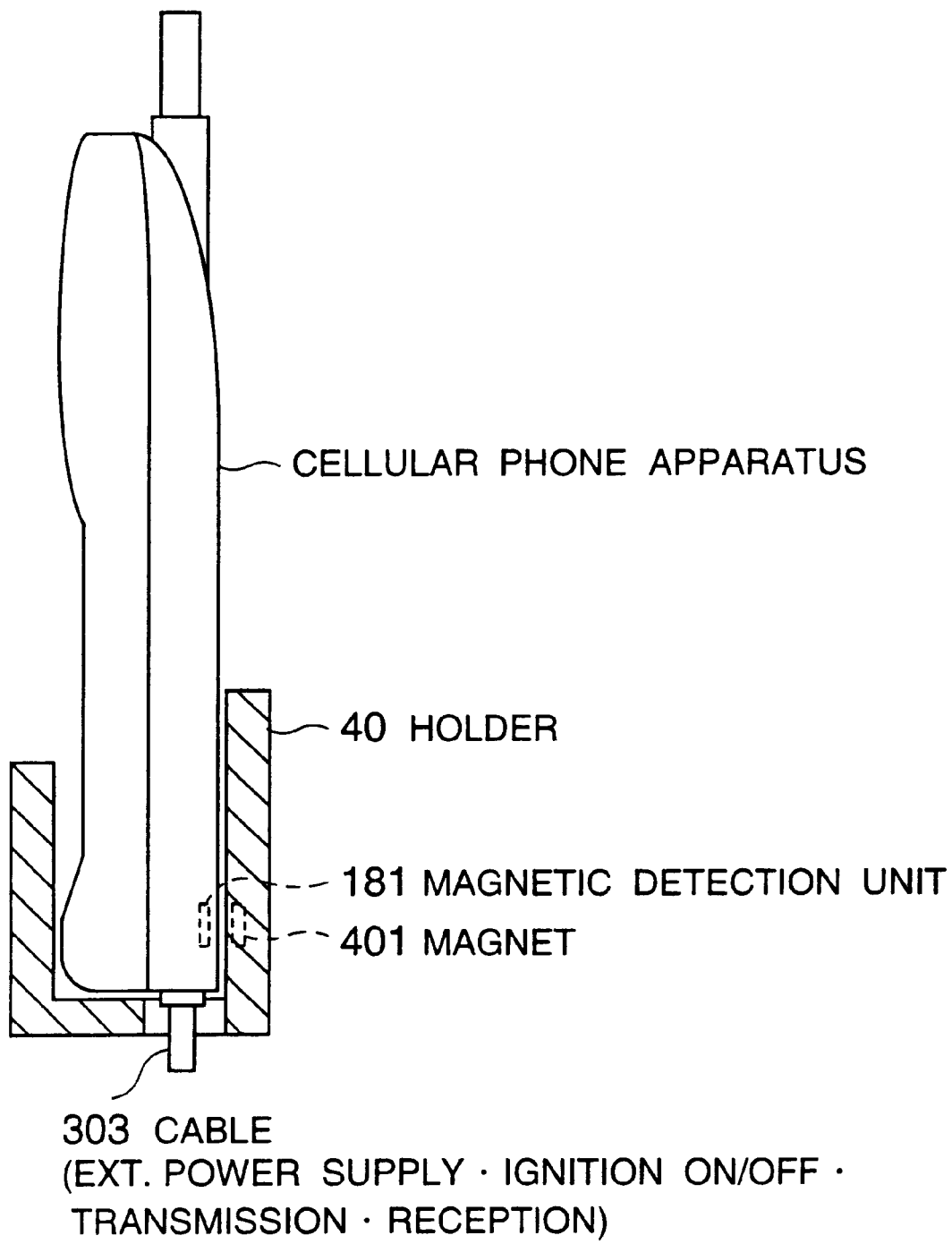
FIG. 3 is a view showing a cellular phone apparatus of the embodiment of FIG. 1 mounted in a vehicle.

A speaker 4, which is used for voice communication while held to the ear, converts an electric signal from the baseband unit 3 to speech, after amplification in an amplification circuit 5. A microphone 6, which is used for voice communication, converts speech to an electric signal. An amplification circuit 7 amplifies the output of the microphone 6, and outputs it to the baseband unit 3. A second speaker 8 disposed on the back surface, opposite the surface where the ear-speaker 4 is disposed, is for letting persons nearby hear the voice communication, and for listening to the voice communication in a state in which the phone is distant from the ear (permitting two or more persons to hear the communication at once). This speaker 8 converts an electric signal from the baseband unit 3 to speech, after amplification in an amplification circuit 9. The speaker 8 also rings to indicate an incoming call. An external speaker 301 and an external microphone 302 in a car kit 30 are connected to a connecting unit 10 through a cable 303 (FIGS. 1 and 3). This external speaker 301 and this external microphone 302 are used for hands-free communication.

A switching circuit 11 makes and breaks the connection of the baseband unit 3 with each of the three amplification circuits 5, 7, and 9 and the connecting unit 10, under control of a control circuit 12. These three amplification circuits 5, 7, and 9 have fixed gains, and cannot alter the receiving volume or the sensitivity of the microphone. Alteration of the receiving volume and the sensitivity of the microphone is performed by the voice codec 32 in the baseband unit 3, under control of the control circuit 12.

The control circuit 12, which is provided with a microprocessor 12a that operates according to a control program stored in a ROM 13, controls each unit of the apparatus. A RAM 14 stores information required for operation of the control circuit 12.

A liquid crystal display unit 15 displays telephone numbers, the time, an in-range or out-of-range mark, existence of text messages, existence of voice messages, etc. A vibrator 16 generates vibrations when a call is received, under control of the control circuit 12. An ignition-on/off detection means 17 detects whether the ignition switch of the vehicle is on or off, and outputs a signal indicating the detected result to the control circuit 12.

A placement detection means 18 has a magnetic detection unit 181 such as a reed switch or a Hall element. As shown in FIG. 3, a holder 40 having a magnet 401 is attached to the vehicle; when the cellular phone is placed in the holder 40, the magnetic detection unit 181, which is in proximity to the magnet 401, detects magnetism, and the placement detection means 18 outputs a signal to the control circuit 12 indicating that the cellular phone has been set in place.

Input means 19 has digit keys 191 for entry of telephone numbers etc., a start key 192 for starting communication, an end key 193 for terminating communication, and a power key 194 for turning the power of the apparatus on and off.

An internal power supply 20 comprises a rechargeable battery, and outputs a DC voltage of 3.6 V. A connecting unit 21 is for connection of an external power supply, and is connected to an external power supply 50 (a power output terminal which is also used for a cigarette lighter of the vehicle) through a cable 303 (FIG. 3). The external power supply 50 is 12 VDC, and may or may not supply 12 VDC when the ignition switch is off, depending on the type of vehicle.

Figure 2:
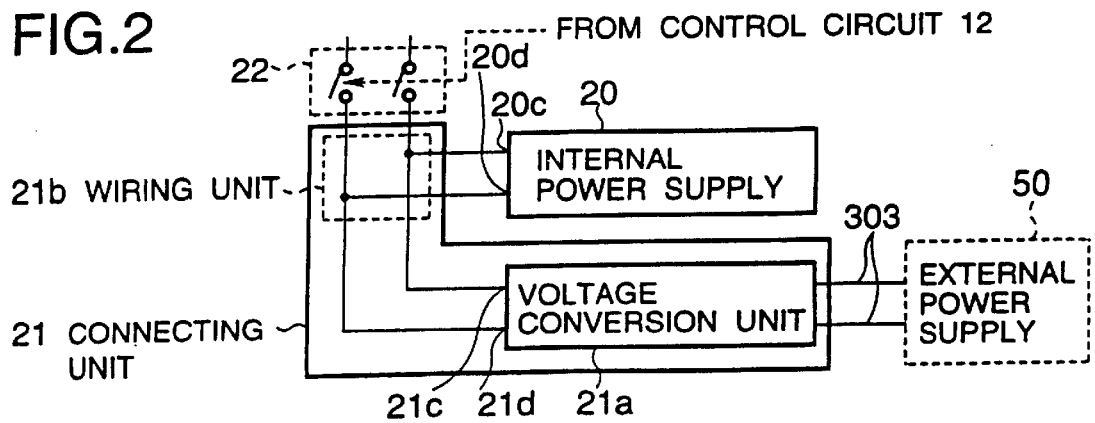
FIG. 2 is a wiring diagram showing the details of the connecting unit 21 of FIG. 1.

The connecting unit 21 has a voltage conversion unit 21a and a connecting wiring unit 21b, as shown in FIG. 2.

The voltage conversion unit 21a transforms the voltage of 12 V from the external power supply 50 to a voltage slightly higher than the voltage of the internal power supply 20, for example, to 4.1 V.

The connecting wiring unit 21b connects output wires connected to the output terminals of the voltage conversion unit 21a and output wires connected to the output terminals of the internal power supply 20 in parallel. That is, the higher-potential terminal 21c of the output terminals of the voltage conversion unit 21a and the higher-potential terminal 20c of the output terminals of the internal power supply 20 are interconnected at a node 21e, and the lower-potential terminal 21d of the output terminals of the voltage conversion unit 21a and the lower-potential terminal 20d of the output terminals of the internal power supply 20 are interconnected at a node 21f.

These connection nodes 21e and 21f are connected to the input side of a switch 22. This switch 22 turns the supply of electric power to the apparatus on and off. The switch 22 is turned on and off through operation of the power key 194. That is, in the state in which the switch 22 is off, if the power key 194 is pressed the switch 22 turns on, and stays in the on state after the power key 194 is released. On the other hand, in the state in which the switch 22 is on, if the power key 194 is pressed, the switch 22 turns off.

Figure 4:
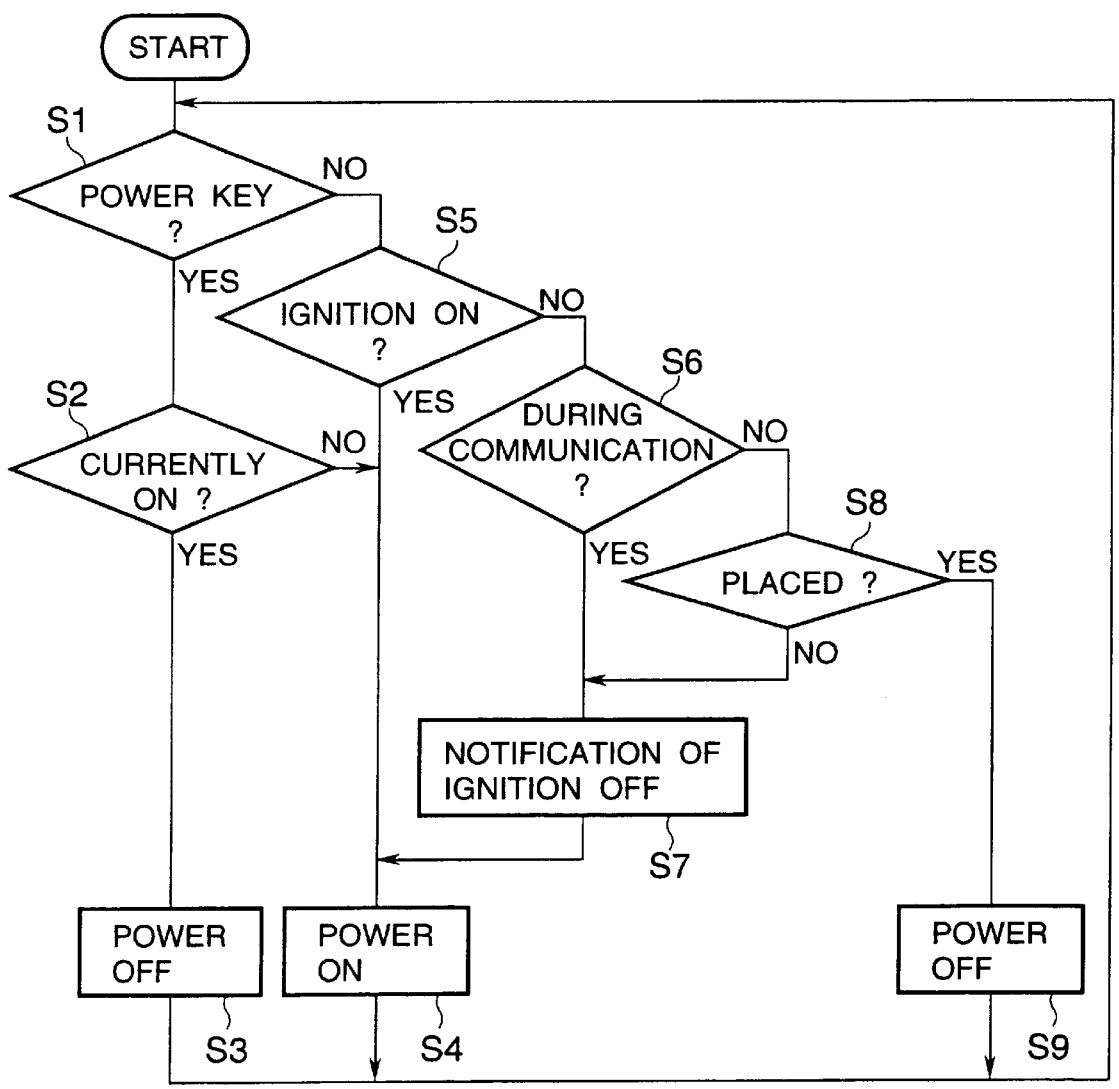
FIG. 4 is a flow chart showing the principal operation of the embodiment of FIG. 1.

The principal operation of this invention will now be explained. FIG. 4 is a flow chart showing the operation of the control circuit 12. If the power key 194 is pressed when the power is on, the control circuit 12 turns the power off, (YES in S1, YES in S2, S3) That is, it shuts off the supply of power to the apparatus from the internal power supply 20 and the external power supply 50 by turning the switch 22 off. If the power key 194 is pressed when the power is off, the control circuit turns the power on (YES in S1, NO in S2, S4). That is, it turns the switch 22 on to have power supplied to the apparatus from the internal power supply 20 and the external power supply 50.

Furthermore, the control circuit 12 turns on the power (S4) when the ignition-on/off detection means 17 detects that the ignition switch is turned on.

If the ignition switch is turned off (NO in S5) during communication (NO in S6), the control circuit 12 produces a notification that the ignition switch is off (S7), by an alert from the speaker 8, for example, and leaves the power on (S4). Accordingly, it is possible to continue communication if the ignition switch is turned off during communication.

If the ignition switch is turned off (NO in S5) when communication is not in progress (NO in S6) but the placement detection means 18 detects that the apparatus is not placed in the holder 40 (NO in S8), the control circuit 12 produces a notification that the ignition switch is off (S7), by an alert from the speaker 8, for example, and leaves the power on (S4).

If the ignition switch is turned off (NO in S5) when communication is not in progress (NO in S6) and the apparatus is placed in the holder 40 (YES in S8), the control circuit 12 turns the power off (S9).

Figure 5:
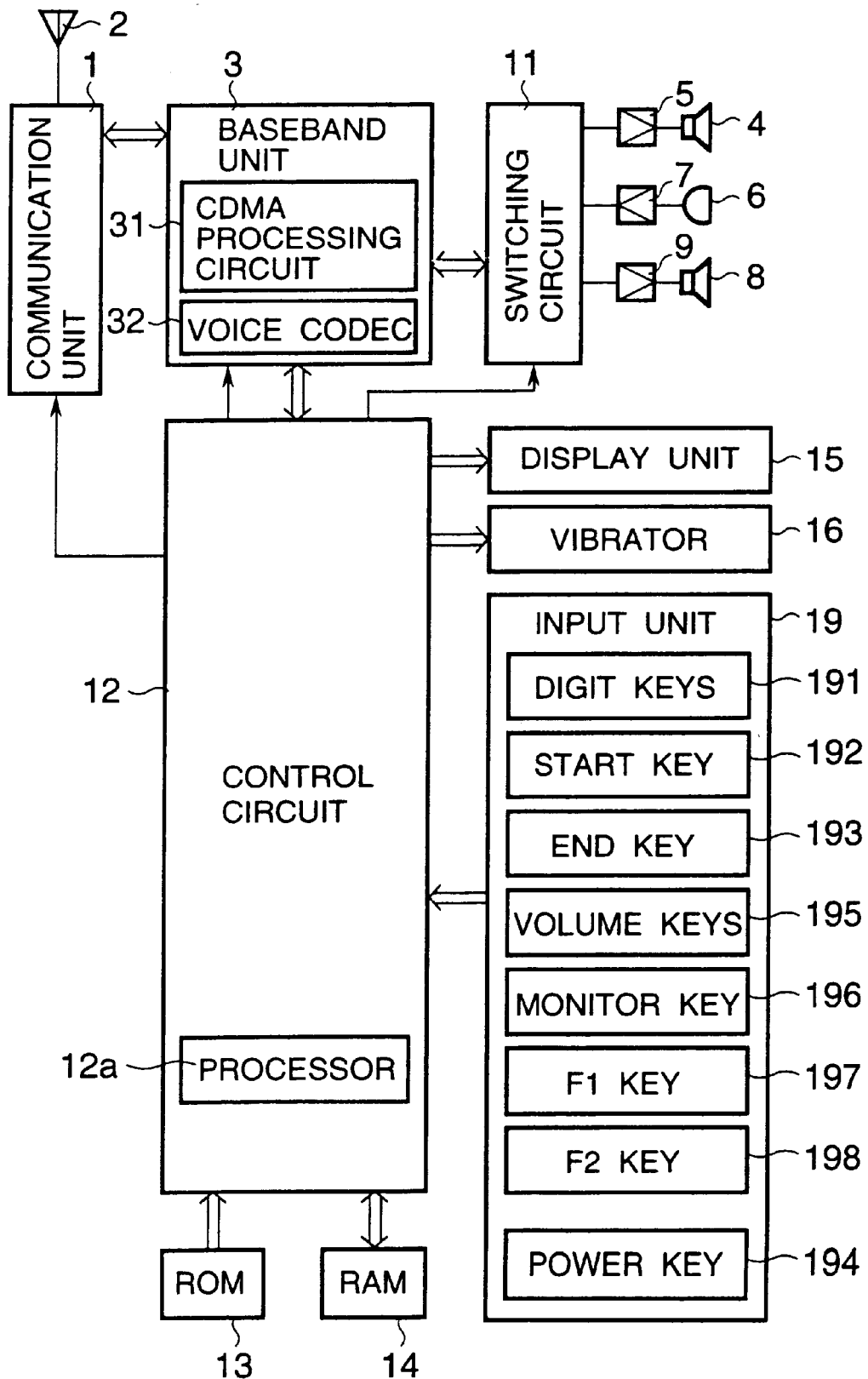
FIG. 5 is a block diagram showing principal elements of the second embodiment of the invention.
Figure 6:
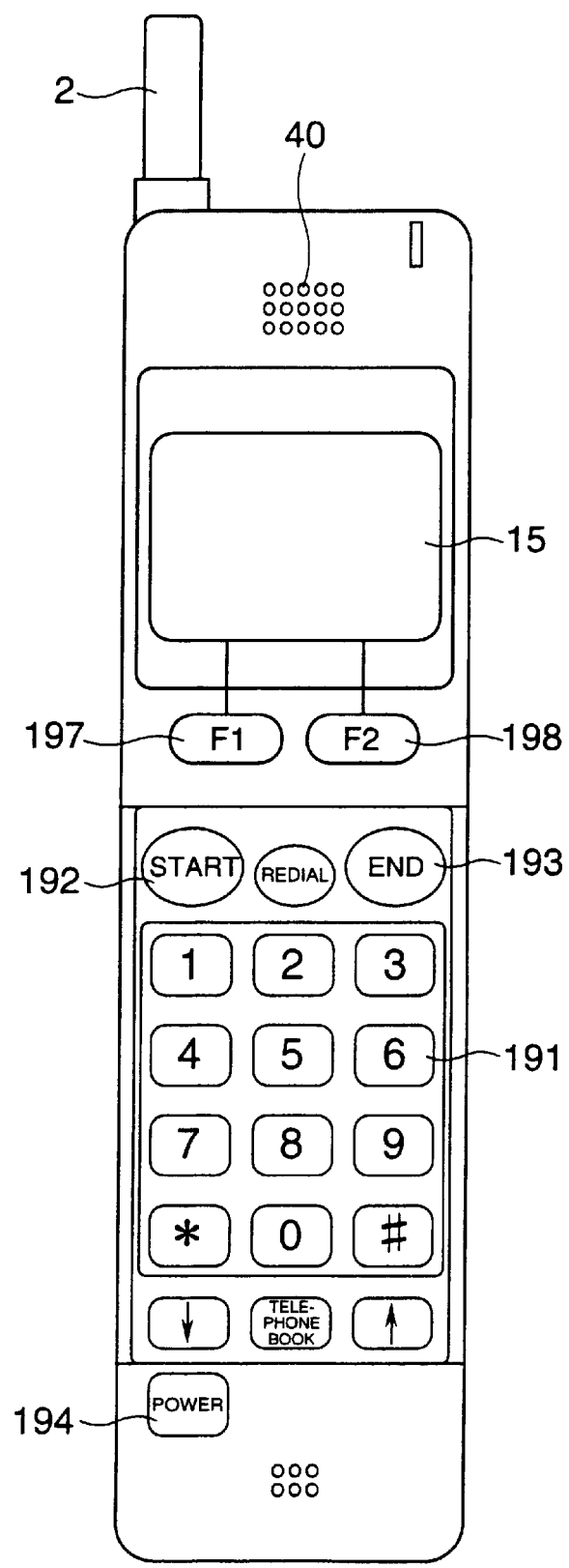
FIG. 6 is a front view of the second embodiment.
Figure 7:
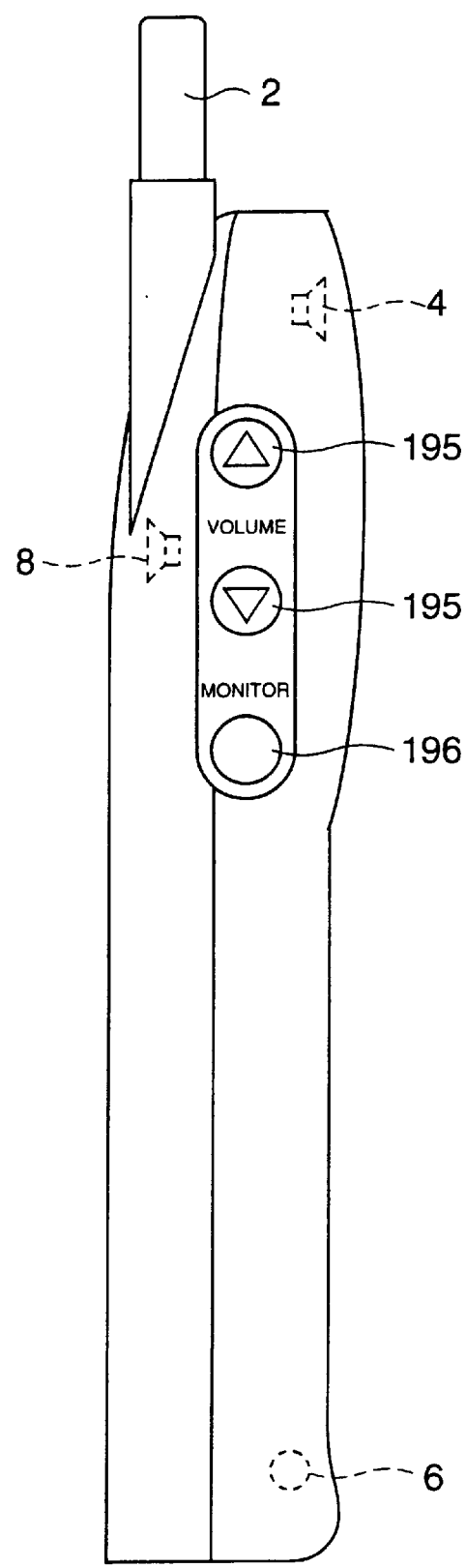
FIG. 7 is a left-side view of the second embodiment.
Figure 8:
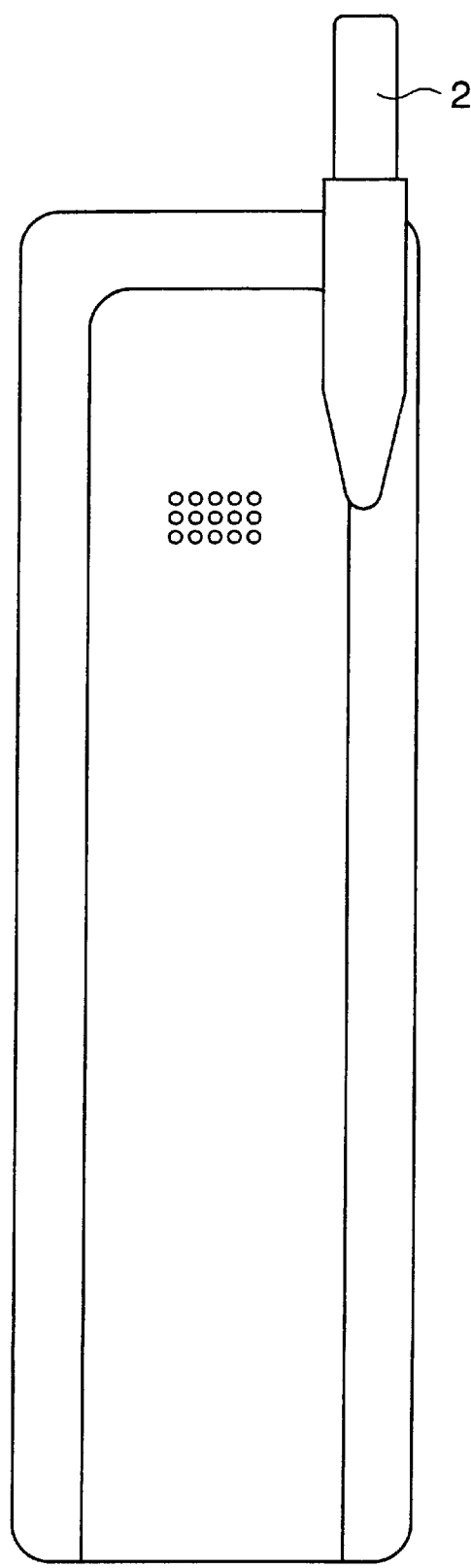
FIG. 8 is a rear view of the second embodiment.

FIG. 5 is a block diagram showing principal elements of the second embodiment of the invention. FIG. 6 is a front view of the apparatus, FIG. 7 is a left-side view, and FIG. 8 is a rear view.

The telephone apparatus of this embodiment also is a cellular phone of the CDMA type which uses a plurality of carriers of the same frequency in the same cell.

Reference numerals identical to those in FIG. 1 represent the same elements.

A communication unit 1 transmits signals from a baseband unit 3 to a base station through an antenna 2, and receives radio waves from the base station through the antenna 2.

The baseband unit 3 has a CDMA processing circuit 31 and a voice codec 32. The CDMA processing circuit 31 performs code division multiple access, scramble, error control, and timing detection. The voice codec 32 compresses (codes) or expands (decodes) speech, performs conversion between analog and digital, and changes the receiving volume and the sensitivity of the microphone by an internal amplification circuit (not shown).

A speaker 4, which is used for voice communication while held to the ear, converts an electric signal from the baseband unit 3 to speech, after amplification in an amplification circuit 5.

The speaker 4 also generates a key-click sound and an audible alert (three short beep tones, or words in synthesized voice) indicating that the connection alert is in the on state. A microphone 6, which is used for voice communication and is disposed in a voice transmission unit (60 in FIG. 6), converts speech into an electric signal. An amplification circuit 7 amplifies the output of the microphone 6, and outputs it to the baseband unit 3.

A speaker 8 disposed so that the output direction of the sound is opposite to that of the ear-speaker 4, as shown in FIG. 7, serves to let persons nearby hear the received sound (a weather report, for example). This speaker 8 converts an electric signal from the baseband unit 3 to speech after amplification in an amplification circuit 9. The speaker 8 also generates an incoming call sound (ringing sound or melody), which is a notification of circuit connection.

A switching circuit 11 makes or breaks the connection of the baseband unit 3 with each of the three amplification circuits 5, 7, and 9 under control of a control circuit 12. These three amplification circuits 5, 7, and 9 have fixed gains, and cannot alter the receiving volume, the key-click volume, or the sensitivity of the microphone. Alterations of the receiving volume, the key-click volume, and the sensitivity of the microphone are performed by the voice codec 32 in the baseband unit 3 under control of the control circuit 12.

The control circuit 12, which is provided with a microprocessor 12a that operates according to a control program stored in a ROM 13, controls each unit of the apparatus. A RAM 14 stores information required for operation of the control circuit 12. A liquid crystal display unit 15 displays telephone numbers and text for various settings. A vibrator 16 generates vibrations when a call is received, under control of the control circuit 12.

An input unit 19 has digit keys 191 for entry of telephone numbers etc., a start key 192 for originating a call and starting communication etc., an end key 193 for terminating communication etc., volume keys 195 (the Δ key and ∇ key in FIG. 7) for adjusting the receiving volume, a monitor key 196 for causing the received sound to be emitted from the speaker 8 at the back, an F1 key 197 and an F2 key 198 for manipulating functions corresponding to text displayed on the display unit 15, and so on. As shown in FIG. 7, the volume keys 195 and the monitor key 196 are disposed on the left side, so the user can operate these keys easily, even during communication. For example, when the phone is held with the left hand during communication, it is possible to operate these keys with the thumb of the left hand, while holding the phone with the palm and the other fingers of the left hand.

The control circuit 12 produces a key-click sound from the speaker 4 when a key of the input unit is pressed. There are four volume levels, mute (0), low (1), medium (2), and high (3) (See FIG. 9), one of which is preset by a predetermined operation by the F1 key 197 and digit keys. Normally, the volume is preset to "medium" to obtain a moderate sound level in a state in which the digit keys 191 are pressed while being viewed, that is, a state in which the ear-speaker 4 that emits the key-click sound is about 40 cm from the ear. These settings are performed by the processor 12a, which operates according to the control program stored in the ROM 13.

The principal operation of the second embodiment will now be explained. FIG. 10 is a flow chart showing the operation of the control circuit 12. The process of this flow chart begins when generation of a key-click sound is required. During communication (YES in S11) if the key-click volume is not preset to 0 (mute) or 1 (low) (NO in S12), that is, if it is preset to 2 (medium) or 3 (high), the control circuit 12 makes the speaker 4 emit a key-click sound at level 1 (low) (S14). The control circuit 12 controls the volume of this key-click sound by controlling the voice codec 32 in the baseband unit 3.

If the key-click sound has been preset to 0 (mute) or 1 (low) (YES in S12), it is adjusted to mute or 1 (low) as per the setting (S13). If communication is not in progress (NO in S11) the key-click sound is generated as per the setting (S13).

For example, in a state in which the key-click sound has been preset to 3 (high), if any key, such as a volume key 195 or the monitor key 196 disposed on the side, is pressed during communication, the key-click sound is adjusted to (low). Thus, a user holding the receiver speaker close to his ear hears the key-click sound at the low volume level.

This embodiment is also applicable to a telephone apparatus that outputs a key-click sound from an earphone.

INDUSTRIAL APPLICABILITY

A vehicle-installed telephone apparatus according to a first aspect of the invention comprises:

an internal power supply (20) for supplying electric power within the apparatus;

a connecting unit (21*b*) for connecting an external power supply (50) from the vehicle in parallel with said internal power supply (20);

a switch (22) for turning on and shutting off the supply of electric power into the apparatus from said internal power supply and said external power supply, which are connected in parallel;

ignition-on/off detection means (17) for detecting whether the ignition switch of the vehicle is on or off; and control means (12) for controlling said switch so as to supply electric power to the apparatus if communication is in progress, even when said ignition-on/off detection means (17) detects that the ignition switch is off.

Accordingly, when the ignition switch is turned off during communication and the supply of electric power from the external power supply is interrupted, it is possible to continue the communication by use of the internal power supply. Furthermore, if external power is supplied even when the ignition switch is turned off during communication, it is possible to reduce the drain on the internal power supply by use of the external power supply.

Furthermore, since the internal power supply and the external power supply are connected in parallel for supply of power, and a switch for turning on and shutting off this parallel power supply is provided, it is possible for a single switch both to perform manual power-on/off and to control the supply of power from the internal power supply if the supply from the external power supply is halted when the ignition switch is turned off.

A vehicle-installed telephone apparatus according to a second aspect of the present invention comprises:

an internal power supply (20) for supplying electric power within the apparatus;

a connecting unit (21*b*) for connecting an external power supply (50) from the vehicle in parallel with said internal power supply (20);

a switch (22) for turning on and shutting off the supply of electric power into the apparatus from said internal power supply and said external power supply, which are connected in parallel;

ignition-on/off detection means (17) for detecting whether the ignition switch of the vehicle is on or off;

placement detection means (18) for detecting whether the apparatus is placed in a predetermined position in the vehicle; and control means (17) for controlling said switch so as to supply power to the apparatus if said placement detection means (18) detects that the apparatus is not placed in the predetermined position, even when said ignition-on/off detection means (17) detects that the ignition switch is off.

Accordingly, when the ignition switch is turned off and the supply of external power is halted, power can be maintained by use of the internal power supply when the telephone apparatus is simply picked up from its holder, so information can be displayed on the display unit without requiring any key operation.

Furthermore, since the internal power supply and the external power supply are connected in parallel for supply of power, and a switch for turning on and shutting off this parallel-connected power supply is provided, it is possible for a single switch both to perform manual power-on/off and to control the supply of power from the internal power supply if the supply from the external power supply is halted when the ignition switch is turned off.

A telephone apparatus according to a third aspect of the present invention comprises:

a speaker (4) which is disposed in a receiver (40) and emits a key-click sound; setting means (12) for setting the volume of the key-click sound emitted from said speaker; and control means (12) for adjusting the key-click sound to at most a predetermined volume during communication, and adjusting the key-click sound to the volume set by said setting means if communication is not in progress.

Accordingly, it is possible to avoid having the user hear loud key-click sounds during communication, since the key-click sound is set to a predetermined low volume level during communication.

What is claimed:

1. Telephone apparatus comprising:

a receiver;

a speaker connected to the receiver and capable of emitting a key-click sound;

a setting device for setting a volume of the key-click sound independently of a volume of a speech received by the receiver; and a controller connected to the setting device and
  operative with manipulation by a user of the telephone apparatus when communication is not in progress for adjusting the key-click sound to the volume set by the setting device, and
  operative without manipulation by the user of the telephone apparatus when communication is in progress for adjusting the key-click sound to a volume set by the setting device if the volume set by the setting device is equal to or less than a predetermined volume and for adjusting the key-click sound to the predetermined volume if the volume set by the setting device is greater than the predetermined volume.

* * * * *